(12) United States Patent
Iyer et al.

(10) Patent No.: US 6,563,804 B1
(45) Date of Patent: May 13, 2003

(54) SYSTEM AND METHOD FOR PROVIDING FULL-DUPLEX AUDIO COMMUNICATION USING A HALF-DUPLEX AUDIO CIRCUIT

(75) Inventors: Prakash Iyer, Beaverton, OR (US); Gunner Danneels, Beaverton, OR (US); Lance Carroll, Austin, TX (US); Eric Davison, Seattle, WA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/002,697

(22) Filed: Jan. 5, 1998

(51) Int. Cl.[7] ................................................. H04J 5/16
(52) U.S. Cl. ...................................................... 370/296
(58) Field of Search ................................ 370/276–280, 370/293, 296, 275, 401, 351, 352, 281, 285, 294

(56) References Cited

U.S. PATENT DOCUMENTS

| | | | | |
|---|---|---|---|---|
| 5,561,666 A | * | 10/1996 | Christensen et al. | ........ 370/276 |
| 5,734,643 A | * | 3/1998 | Rondeau | ...................... 370/279 |
| 5,923,663 A | * | 7/1999 | Bontemps et al. | ........... 370/279 |
| 5,959,979 A | * | 9/1999 | Stratmoen | .................... 370/276 |
| 6,044,150 A | * | 3/2000 | Rigstad et al. | .............. 370/276 |

\* cited by examiner

Primary Examiner—Dang Ton
(74) Attorney, Agent, or Firm—Blakley, Sokoloff, Taylor & Zafman LLP

(57) ABSTRACT

The present invention discloses a method for providing full-duplex audio communication utilizing a half-duplex audio circuit in an audio communication system. The method comprises the steps of: (1) configuring an idle state, a listen state, and a talk state; (2) receiving an event triggered by one of an incoming speech, an outgoing speech, and a talk request from the half-duplex audio circuit; and (3) transitioning from one of the states to any one of the states in response to the event to provide full duplex communication.

18 Claims, 4 Drawing Sheets

SYSTEM AND METHOD FOR PROVIDING FULL-DUPLEX AUDIO COMMUNICATION USING A HALF-DUPLEX AUDIO CIRCUIT

BACKGROUND OF THE INVENTION

1. Field of the Invention

The present invention relates to packet-switched telephony. Specifically, the present invention relates to full-duplex audio communication using a half-duplex audio circuit.

2. Description of Related Art

It is now common to transmit voice signals over data networks such as the Internet which is essentially a collection of packet switched networks. The processing of voice signals for transmission is usually performed by audio cards in a personal computer (PC) platform.

There are two types of audio cards that are designed to support two types of audio communication over such data networks: half-duplex and full-duplex. In half-duplex communication, voice data can be transmitted in only one direction at a time. The speaker is required to press a "push-to-talk" or "request-to-talk" every time he or she wants to transmit his or her voice data. Examples of audio half-duplex communication include the walkie-talkie transmission. In contrast, full-duplex communication allows voice data to be transmitted in both directions simultaneously. An example of full-duplex communication is the conversation over the regular telephone line. Speakers on both sides freely speak. Audio cards implementing the half-duplex protocol have simple hardware circuitry but do not provide the desirable normal conversations as in full-duplex communication.

Accordingly, there is a need in the technology to provide full-duplex mode in half-duplex audio card with smooth transitions from one state to another without causing too many audio artifacts.

SUMMARY OF THE INVENTION

The present invention discloses a method for providing full-duplex audio communication utilizing a half-duplex audio circuit in an audio communication system. The method comprises the steps of: (1) configuring an idle state, a listen state, and a talk state; (2) receiving an event triggered by one of an incoming speech, an outgoing speech, and a talk request from the half-duplex audio circuit; and (3) transitioning from one of the states to any one of the states in response to the event to provide full duplex communication.

BRIEF DESCRIPTION OF THE DRAWINGS

The advantages of the present invention will become more readily apparent to those ordinarily skilled in the art after reviewing the following detailed description and accompanying drawings, wherein.

DETAILED DESCRIPTION OF THE INVENTION

The present invention discloses a method to provide full-duplex communication utilizing a half-duplex audio circuit. The method provides three states: a listen state, a talk state, and an idle state.

The transition from one state to another is determined based on the audio environment including silence, incoming speech, and outgoing speech.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
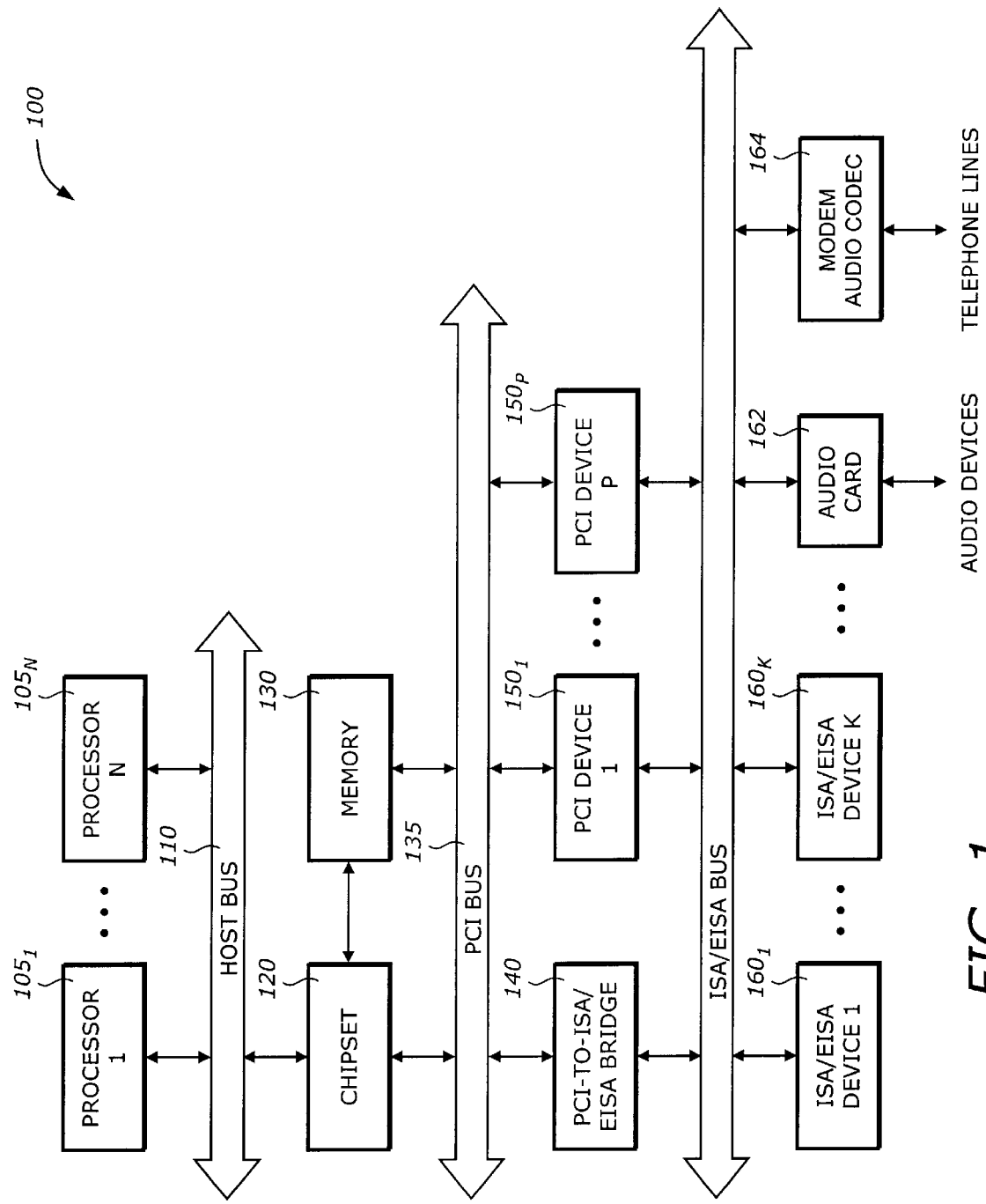
FIG. 1 is a diagram illustrating one embodiment of a computer system that operates in accordance with the teachings of the present invention.

Referring to FIG. 1, an illustrative embodiment of a computer system 100 that operates in accordance with the teachings of the present invention is shown. The computer system 100 comprises one or more processors $105_1$–$105_N$ ("N" being a positive whole number) and a main memory element 130 (e.g., dynamic random access memory "DRAM", static random access memory "SRAM" etc.) coupled together by a host bus 110 and a chipset 120. In general, the chipset 120 is a host-to-PCI bridge which operates as an interface between a host bus 110 and a peripheral PCI bus 135. The main memory 130 also includes a non-volatile memory or separately powered memory (e.g., DRAM, SRAM) for saving contents of registers or other memories when power is removed.

Processors $105_1$–$105_N$ are any microprocessors that are capable of handling a pipelined and/or parallel bus. In one embodiment, processors $105_1$–$105_N$ are the Pentium® processors manufactured by Intel Corporation of Santa Clara, Calif. In another embodiment, processors $105_1$–$105_N$ are the Pentium® II or Pentium® Pro processors manufactured by Intel Corporation of Santa Clara, Calif.

Chipset 120 typically includes a cache DRAM controller (CDC), a peripheral bus controller, and a data path unit (DPU). The peripheral bus 135 may comprise a Peripheral Component Interconnect (PCI) bus or any other type of bus architecture. The chipset or Host-to-PCI Bridge 120 provides a set of host-to-PCI and PCI-to-host bus transaction translations.

The host bus 110 is a bus that can support transactions to a number of coupled processors. Host bus 110 may be referred to as a parallel bus or multiprocessor bus because it supports parallel operations and multiple processors. It is contemplated that host bust 110 operates in a pipelined manner to increase efficiency. However, these features should not be construed to limit the teachings of the present invention.

The PCI bus 135 provides a communication path between the processors $105_1$–$105_N$ or main memory element 130 and a plurality of peripheral devices $150_1$–$150_P$ ("P" being a positive whole number) and an audio card 152. The peripheral devices $150_1$–$150_P$ may include I/O devices such as disk controller, and peripheral components such as DMA controllers, Local Area Network (LAN) controller, and audio/video capture cards.

The PCI-to-ISA Bridge 140 provides the communication path between the peripheral or PCI bus 135 and the expansion or ISA/EISA bus 155.

The expansion bus 155 may comprise an Industry Standard Architecture (ISA) bus or an Extended Industry Standard Architecture (EISA) bus. The ISA/EISA bus 155 provides a communication path between the peripheral PCI bus 135 and a plurality of expansion ISA/EISA peripheral devices $160_1$–$160_K$ ("K" being a positive whole number), an audio card 162, and a modem and/or audio codec 164. The expansion ISA/EISA peripheral devices $160_1$–$160_K$ may include any suitable devices such as serial communication interface and programmable timers. The audio card 162 includes circuitry to perform audio signal processing. In one embodiment, the audio card 162 is attached to the PCI bus 135. The audio card 162 operates as a half-duplex communication device. The present invention provides a full-duplex mode on the half-duplex audio card 162. The audio card 162 is interfaced to a number of audio devices such as microphone, cassette or Compact Disk (CD) player, headphones, stereo amplifier, speakers, and joystick musical instrument digital interface (MIDI) connector. The modem and/or audio codec 164 provides the audio interface to the telephone lines or other communication channels.

One or more of processors $105_1$–$105_N$ executes an audio processing program stored in memory 130 to provide full duplex communication using the half-duplex audio card 162.

Figure 2:
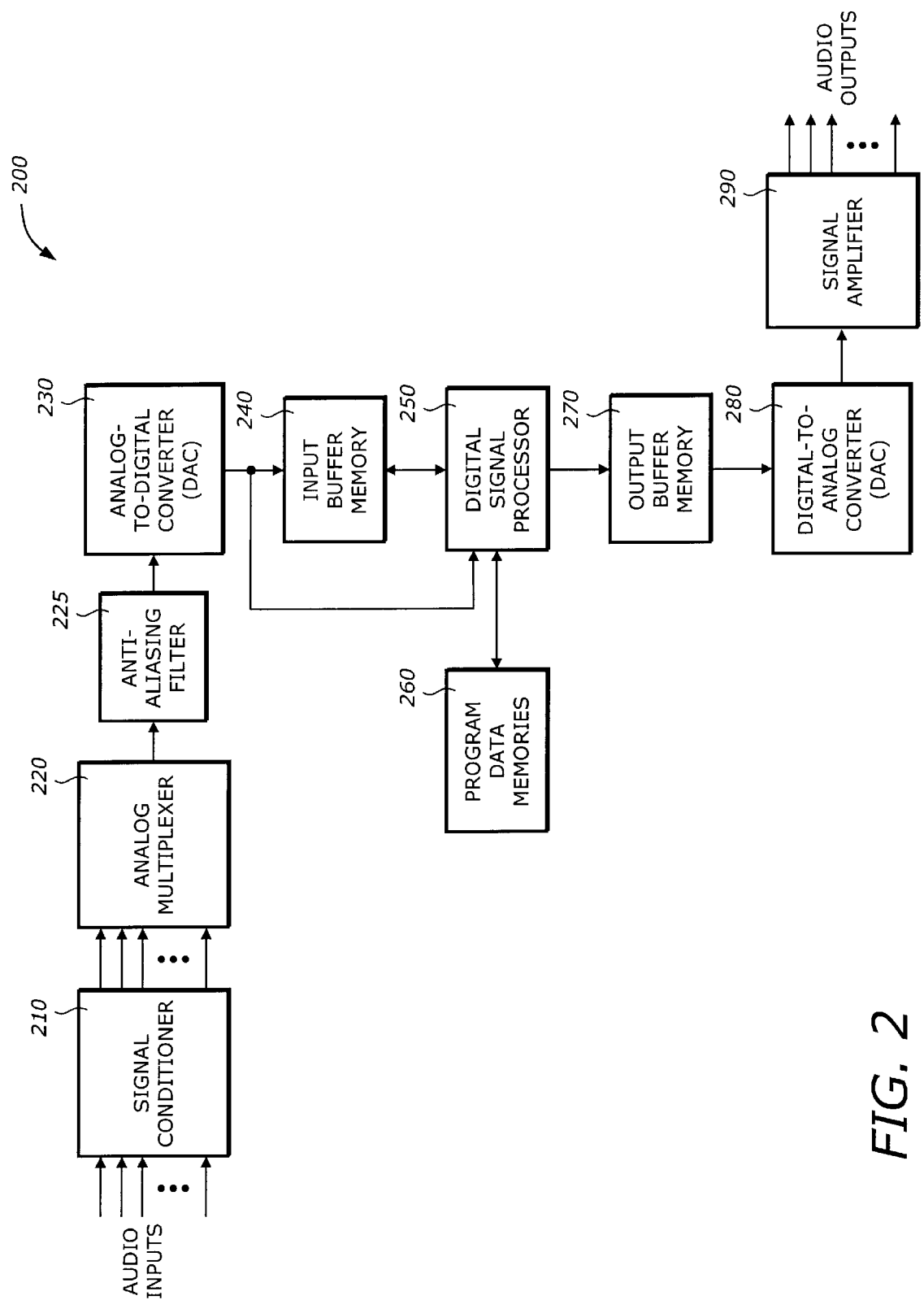
FIG. 2 is a diagram illustrating one embodiment of an audio card that operates in accordance with the teachings of the present invention.

Referring to FIG. 2, an illustrative embodiment of an audio card 200 that operates in accordance with the teachings of the present invention is shown. The audio card 200 may be one embodiment or a variation of the audio card 162. The audio card 200 comprises a signal conditioner 210, an analog multiplexer 220, an anti-aliasing filter 225, an analog-to-digital converter (ADC) 230, an input buffer memory 240, a digital signal processor (DSP) 250, program and data memories 260, an output buffer memory 270, a digital-to-analog converter (DAC) 280, and a signal amplifier 290.

The signal conditioner 210 receives audio inputs from several sources such as a microphone, a cassette or CD player, a musical instrument via a MIDI connector. The audio analog input signals are conditioned, filtered, and amplified by the signal conditioner 210. The analog multiplexer 220 selects one out of multiple audio signal inputs for processing. The anti-aliasing filter 225 eliminates the high frequency noise components of the audio signal. In one embodiment, the anti-aliasing filter 225 is used for each analog signal before the signal conditioner 210 or the analog multiplexer 220. The ADC 230 converts the analog signal into 16-bit or 18-bit digital data. The digitized data are stored into the input buffer memory 240 and/or processed by the DSP 250.

The input buffer memory 240 stores the digitized data to be processed by the DSP 250. The input buffer memory 240 may be organized as a first-in-first-out (FIFO) buffer, or a standard memory using SRAM or DRAM. The DSP 250 processes the digitized data either directly from the ADC 230 or from the buffer memory 240. The DSP 250 may be any commercially available DSPs that are designed for digital signal processing tasks. Examples of these DSPs are the TMS-320xx family manufactured by Texas Instruments at Dallas, Tex., and the ADSP-2106x family manufactured by Analog Devices at Norwood, Mass. The program and data memories 260 includes program memory that stores the program executed by the DSP 250, and data that are accessible to the DSP 250. The program executed by the DSP 250 includes code to perform full-duplex communication in accordance with the state of diagram in FIGS. 3 & 4. In one embodiment, the program executed by the DSP 250 includes code to perform half-duplex communication which is modified to operate in accordance with the teachings of the present invention.

The output buffer memory 270 includes memory to store the data processed by the DSP 250. The DAC 280 converts the digital data from the buffer memory to analog signal. In one embodiment, the DAC 280 converts the digital data directly from the DSP 250. The signal amplifier/demultiplexer 290 amplifies and/or level shifts the analog signal to appropriate audio outputs. The signal amplifier/demultiplexer 290 also demultiplexes the analog signals to several audio outputs that will go to audio speakers, stereo amplifiers, and MIDI devices.

Theory of operation

A full-duplex communication on a half-duplex audio card comprises three states: a listen state, a talk state, and an idle state. A state is defined as a distinct mode of operation. A state can be implemented as a function, a procedure, or a subroutine executed by the DSP on the audio card. Alternatively, a state can be implemented as a function, a procedure, or a subroutine executed by a host processor. A state can also be implemented as a digital circuit. The operation of the system is best illustrated by a state diagram. A state diagram shows the transitions from one state to another state in response to external conditions or events.

A half-duplex audio card has an interface to a talk request or a push-to-talk button. This talk request allows the speaker to initiate a voice transmission. Although a normal full-duplex communication does not need a talk request, a full-duplex communication on a half-duplex audio card should take into account if this talk request is activated. In addition, a full-duplex communication should be able to detect if there is a silence, an incoming speech or an outgoing speech in order to change state accordingly. This detection is facilitated by processing the audio signal in units of time, referred to as frames.

The detection of silence is performed by a Silence Detector (SD). The SD detects silence by classifying a frame as silence or non-silence. The classification is based on three parameters:

Frame energy

Zero-crossing count

First Linear predictor (based on Levinson's method)

Conceptually, the SD is based on the computation of the audio energy over a time period by keeping track of silence frames and non-silence frames. Initially, the silence detection is based on the comparison of the initial frame energy with a pre-determined threshold. Subsequently, the detection is based on the statistics of the past silence and non-silence frames.

The energy values are loaded in 2 arrays holding the previous N silence and non-silence frames. Following this step, the new mean energies of the silence and non-silence frames are calculated. A separate array stores statistics on past values of the energy absolute difference $D=|E_s-E_{us}|$ where $E_s$ is the energy of silence frames and $E_{us}$ is the energy of non-silence frames. The initialization process terminates if the mean value of D (i.e., the average value of D over a predefined time period) exceeds some fixed threshold and some minimum time (in terms of number of frames) has passed. The classification process starts if mean (D) exceeds a pre-defined minimum value and $$mean\ (E_s) + mean\ (E_d) < Energy\ squelch\ value$$

where $E_d$ is the energy deviation and the Energy squelch value represents the noise floor (i.e., the ambient noise level) in the operational environment.

The classifier employs deviations to the classifier parameters over a historical range of previous N frames. Two adaptive thresholds to hold the range crossing (silence to non-silence and vice-versa) are updated. At this point the switch from silence to non-silence is based on the mean deviation of the classifier parameters exceeding the computed transition thresholds. Each computed transition threshold includes a constant offset and a corresponding mean deviation.

In one embodiment, the decision to switch uses majority voting [i.e., the majority is determined as (N/2+1) for N frames per packet], to determine if a packet has all silence frames or all frames with data.

Figure 3:
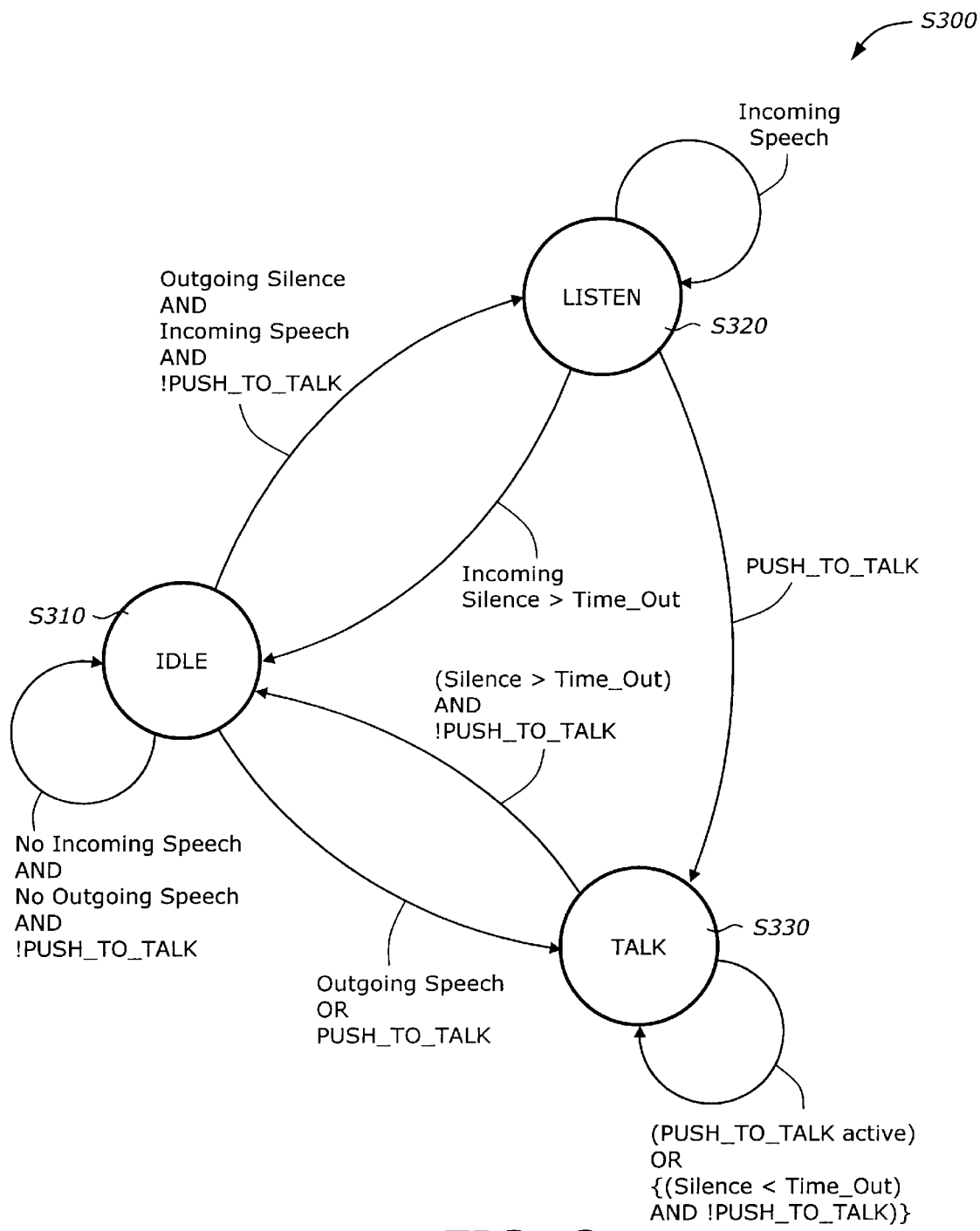
FIG. 3 is a state diagram illustrating one embodiment of the present invention.

Referring to FIG. 3, a state diagram illustrating one embodiment of the system state S300 in the present invention is shown. The system state S300 comprises three states: the IDLE state S310, the LISTEN state S320, and the TALK state S330. In the IDLE state S310, if silence suppression is turned on locally there is no outgoing speech being sent to the remote end and there is no incoming speech being played out of the speakers. In the LISTEN state S320, the audio data is being received from the remote end. Due to the half-duplex communication, outgoing speech is not delivered to the voice activation engine. In the TALK state S330, locally captured voice (i.e., outgoing speech) is delivered to the remote end. Incoming speech may still be received and stored in buffer memory but it is not played out of the local speaker.

Upon start up, the system state S300 is at the IDLE state S310. In the IDLE state S310, there is no significant audio activity. Therefore, if there is no detection of incoming or outgoing speech and there is no push-to-talk request, the system state S300 remains in the IDLE state S310.

While in the IDLE state, if there is incoming speech and there is no push-to-talk request, the system state S300 transitions from the IDLE state S310 to the LISTEN state S320 at which time a listen timer is reset upon entering the LISTEN state. On the other hand, if there is outgoing speech or there is push-to-talk request, the system state S300 transitions from the IDLE state S310 to the TALK state S330.

When the system state S300 is at the LISTEN state S320, it remains in the LISTEN state S320 if there is incoming speech or the silence period is less than a pre-determined LISTEN time-out period.

While in the LISTEN state, whenever there is silence, the listen timer starts running. If the silence period exceeds the LISTEN time-out period, the system state S300 transitions from the LISTEN state S320 back to the IDLE state S310. If there is a push-to-talk request, the system state S300 transitions from the LISTEN state S320 to the TALK state S330.

When the system state S300 is in the TALK state S330, it remains in the TALK state S330 if the push-to-talk request is active. While in the TALK state, whenever there is silence, the talk timer starts running.

While in the TALK state, if the push-to-talk request is inactive and the silence period is less than a pre-determined TALK time-out period, the system state S300 remains in the TALK state S330.

On the other hand, if the push-to-talk request becomes inactive or the silence period exceeds the TALK time-out period, the system state S300 transitions from the TALK state S330 to the IDLE state S310.

Figure 4:
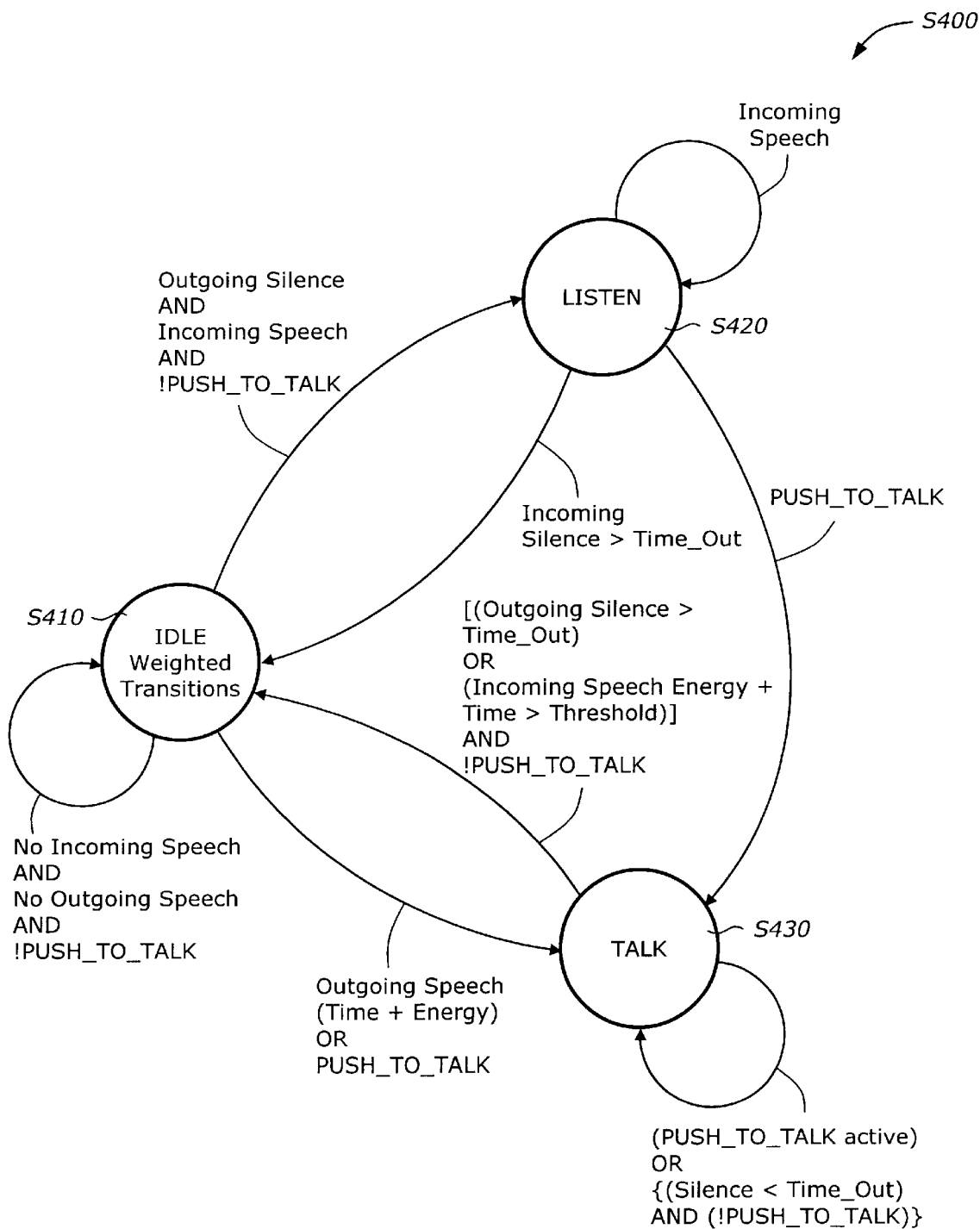
FIG. 4 is a state diagram illustrating an another embodiment of the present invention.

Referring to FIG. 4, a state diagram of another embodiment of the system state S300, system state S400, is shown. System state S400 comprises three states: IDLE state S410, LISTEN state S420, and TALK state S430. The data flow structure of these states is similar to that of the system state S300.

The state machine stays in the IDLE state S410 as long as there is outgoing silence and incoming silence, i.e., there is no outgoing speech and no incoming speech. From the IDLE state S410, the state machine can transition either to the LISTEN state S420 or TALK state S430. In this embodiment, a weighted transition policy is employed. This policy allows the state machine to transition to a more important state in cases where there is simultaneous detection of speech. For example, if the incoming speech is more important than outgoing speech, then if both speeches are detected, the state machine will transition to the LISTEN state S420 which corresponds to incoming speech.

From the IDLE state S410, if there is outgoing silence (i.e., no outgoing speech) and there is incoming speech and there is no push-to-talk request, the system state S400 transitions to the LISTEN state S420.

From the IDLE state S410, if there is a push-to-talk request or if there is outgoing speech, the system state S400 transitions to the TALK state S430. The transition based on the outgoing speech may be weighed in terms of time and energy. For example, if outgoing speech is less important, then even if it is detected, the transition to the TALK state S430 will not take place immediately, rather the state machine will wait for some time period in case incoming speech is detected. If there is no incoming speech is detected, the machine will transition to the TALK state. Similarly, the transition from the IDLE state S410 to the TALK state S430 may be weighed in terms of the average energy D as discussed earlier.

The system state S400 will stay in the LISTEN state S420 if there is continuous incoming speech. When there is no incoming speech while the system state S400 is in the LISTEN state S400, a listen timer will start running. When there is incoming speech while the system state S400 is in the LISTEN state S420, the listen timer is reset.

From the LISTEN state S420, if the listen timer exceeds a predetermined listen time-out limit, i.e., if there is no incoming speech for a period longer than a pre-determined time-out value, a transition occurs from the LISTEN state S420 to the IDLE state S410.

From the LISTEN state S420, if there is a push-to-talk request, the system state S400 transitions to the TALK state S430.

The system state S400 will stay in the TALK state S430 as long as the push-to-talk request is active, i.e., as long as outgoing speech is desired. A talk timer is started to run when there is outgoing silence, i.e., when there is no outgoing speech and push-to-talk is not active. In addition, the incoming speech is constantly monitored.

If there is no push-to-talk request or the push-to-talk request becomes inactive, the system state S400 will transition to the IDLE state S410 if one of the following conditions exists: (1) the outgoing silence lasts more than a predetermined talk time-out limit, i.e., the talk timer exceeds a time-out limit, and (2) the energy and/or time of the incoming speech exceeds a threshold, i.e., if the incoming speech energy exceeds a preset level for a preset period of time. Condition (2) allows for an interrupt caused by a remote user.

The combination of the features provides significant smooth state transitions resulting in fewer audio break-up artifacts caused by flip-flop state transitions.

The present invention provides full-duplex communication on a half-duplex audio card by defining three distinct states: idle, talk, and listen. The transitions from one state to another are based on considerations of the audio environment including detection of silence, incoming speech, and outgoing speech.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:

configuring an idle state, a listen state, and a talk state;

receiving an event triggered by one of an incoming speech, an outgoing speech, and a talk request from said half-duplex audio circuit; and transitioning from one of the states to any one of the states in response to said event to provide full duplex communication;

wherein transitioning comprises transitioning from one of the idle state and the talk state to another one of the idle state and the talk state when said event indicates that a measurement of one of an incoming speech energy and an outgoing speech energy exceeds a predetermined energy threshold over a predetermined time period.

2. The method of claim 1 wherein receiving includes detecting if said event has occurred.

3. The method of claim 1 wherein transitioning further comprises a step of transitioning from the idle state to the idle state when said event indicates that there is no incoming speech, no outgoing speech, and no talk request.

4. The method of claim 1 wherein transitioning further comprises transitioning from the idle state to the listen state when said event indicates that there is no outgoing speech and there is incoming speech and there is no talk request.

5. The method of claim 1 wherein transitioning further comprises transitioning from the idle state to the talk state when said event indicates that there is one of said outgoing speech and said talk request.

6. The method of claim 1 wherein transitioning further comprises transitioning from the listen state to the listen state when there is continuous incoming speech.

7. The method of claim 1 wherein transitioning further comprises transitioning from the listen state to the idle state when said event indicates that there is no incoming speech for a period longer than a predetermined time-out period.

8. The method of claim 1 wherein transitioning further comprises transitioning from the listen state to the talk state when there is a talk request.

9. The method of claim 1 wherein transitioning further comprises transitioning from the talk state to the talk state when said event indicates there is an active talk request.

10. The method of claim 1 wherein transitioning further comprises transitioning from the talk state to the talk state when said event indicates there is no speech for less than a predetermined time-out period and there is no talk request.

11. The method of claim 1 wherein transitioning further comprises transitioning from the talk state to the idle state when said event indicates that there is no speech for longer than a predetermined time-out period and there is no talk request.

12. An audio communication system, comprising:

a first audio circuit configured to transmit and to receive audio signals;

a second audio circuit coupled to said first audio circuit configured to process the received and the transmitted audio signals, said second audio circuit generating a signal indicative of an event triggered by one of an incoming speech, an outgoing speech, and a talk request; and a state machine coupled to said second audio circuit configured to provide an idle state, a listen state, and a talk state, said state machine transitioning from one of the states to any one of the states in response to said event to provide full duplex communication;

wherein said transitioning comprises transitioning from one of the idle state and the talk state to another one of the idle state and the talk state when said event indicates that a measurement of one of an incoming speech energy and an outgoing speech energy exceeds a predetermined energy threshold over a predetermined time period.

13. The audio communication system of claim 12 further comprising a detector coupled to said second audio circuit for detecting if said event has occurred.

14. The audio communication system of claim 12 wherein said first audio circuit is an audio codec.

15. The audio communication system of claim 12 wherein said second audio circuit is a half-duplex circuit.

16. A system comprising:

a processor;

a first audio circuit coupled to the processor and configured to transmit and to receive audio signals;

a second audio circuit coupled to said first audio circuit and the processor and configured to process the received and the transmitted audio signals, said second audio circuit generating a signal indicative of an event triggered by one of an incoming speech, an outgoing speech, and a talk request; and a memory coupled to the processor, said memory storing program instructions that are executed by the processor to provide a state machine that controls said second audio circuit, said state machine providing an idle state, a listen state, and a talk state, said state machine causing a transition from one of the states to any one of the states in response to said event to provide full duplex communication;

wherein said transitioning including transitioning from one of the idle state and the talk state to another one of the idle state and the talk state when said event indicates that a measurement of one of an incoming speech energy and an outgoing speech energy exceeds a predetermined energy threshold over a predetermined time period.

17. The system of claim 16 wherein said processor is one of a general-purpose microprocessor and a digital signal processor.

18. The system of claim 16 wherein said first audio circuit is an audio codec and said second audio circuit is a half-duplex circuit.

* * * * *